April 26, 1938.  H. E. MARSH  2,115,273
HYDRAULIC BRAKE
Filed March 2, 1937
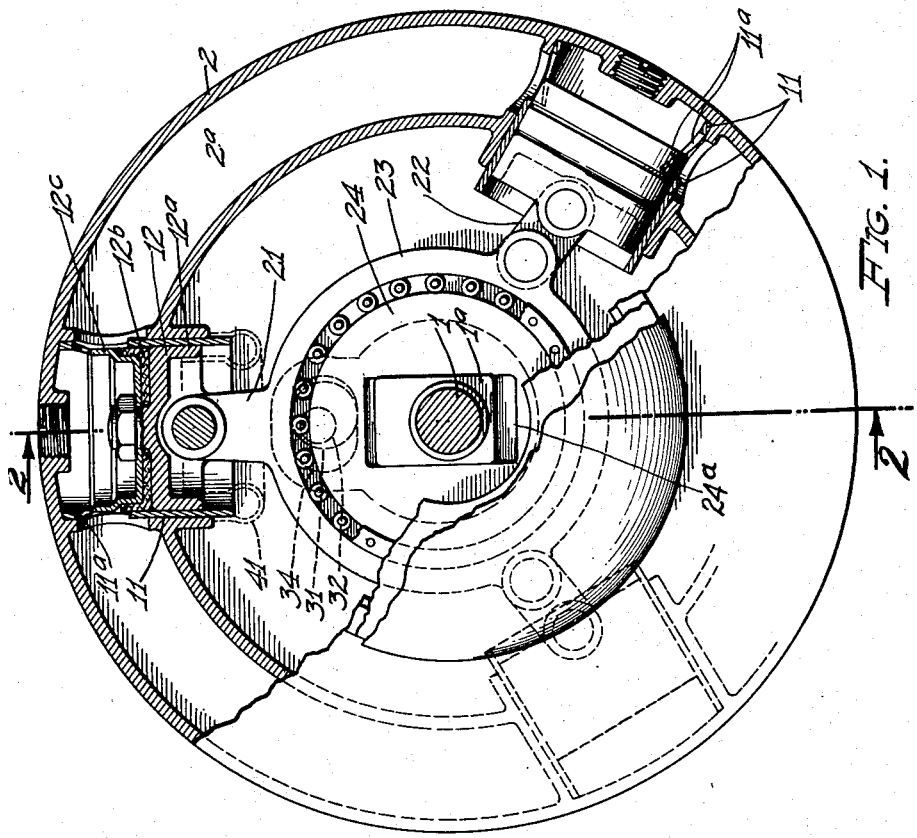
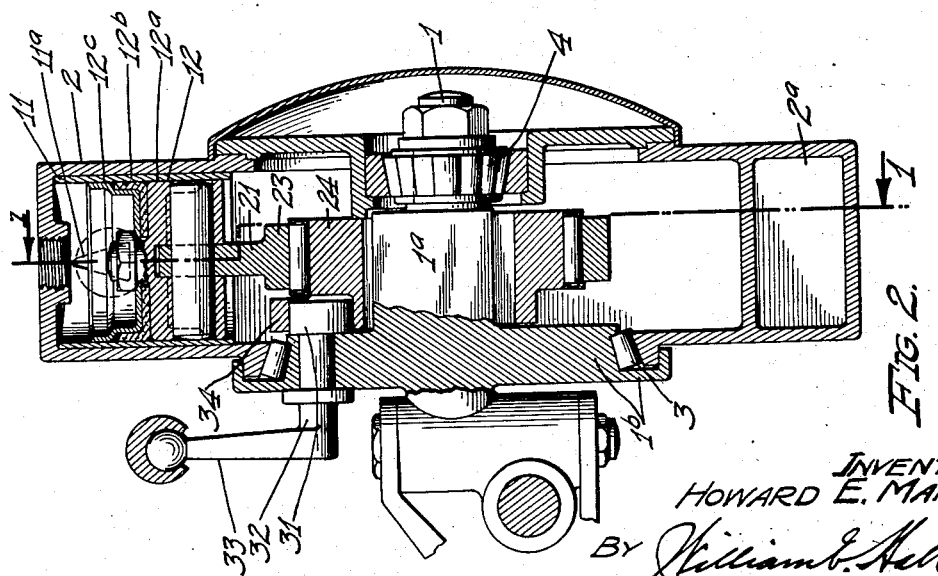
INVENTOR
HOWARD E. MARSH
BY
ATTORNEY.

Patented Apr. 26, 1938

2,115,273

UNITED STATES PATENT OFFICE 2,115,273

HYDRAULIC BRAKE

Howard E. Marsh, Ventura, Calif.

Application March 2, 1937, Serial No. 128,612

8 Claims. (Cl. 188—91)

My present invention relates to fluid or hydraulic brakes and particularly to improvements over U. S. Letters Patents Nos. 1,846,886 and 2,030,308, and over my copending application Serial No. 61,004.

One of the principal objects of this invention is the provision of a fluid or hydraulic brake in which a fluid is subjected to varying pressure when the brake is desired to be applied and in which the fluid under pressure is relieved in a controlled by-pass without valves.

A more particular object of this invention is the provision of ports in the cylinder wall for the reciprocating piston of controlled varying stroke, which ports are so arranged that, as the stroke is increased, the area of the ports is decreased during the movement of the piston in one direction, or in an outward direction, and, as the stroke is increased to its maximum, the ports are fully closed when the piston is moved towards the end of said stroke or in said outward direction.

Another object of this invention is the provision of novel and simple means for shifting the axis of the revolving pistons eccentrically with the axis of the revolving cylinders, or, a novel and simple means for varying the stroke of the relative reciprocation of the pistons and cylinders.

With these and other objects in view, as will appear hereinafter, I have devised a fluid brake having certain novel features of construction, combination and arrangement of parts and portions, as will be hereinafter described in detail and particularly set forth in the appended claims, reference being had to the accompanying drawing and to the characters of reference thereon, which form a part of this application, in which:

Fig. 1 is a fragmentary outer side view of an automobile wheel incorporating my invention in one form, portions being broken away to facilitate the illustration; and, Fig. 2 is a longitudinal sectional view thereof taken through 2—2 of Fig. 1.

The specific embodiment of this invention, as shown in Fig. 2 of the drawing, is in the front wheel of a vehicle in which the wheel is adapted to be steered with respect to the frame of the vehicle. The spindle, designated 1, is here non-rotatable, but is shiftable laterally about a king pin. The wheel 2, which will be hereafter referred to as revoluble member, is rotatably mounted by means of roller bearings 3 and 4 on the spindle.

The radially outer portion of the wheel or revoluble member is preferably in the form of an annular reservoir intercepted by angularly spaced apart, radially arranged cylinders 11, preferably three or more in number. These cylinders are separate members and are pressed or sweated into cylindrical recesses in the reservoir member. The cylinders 11 are provided at their opposite sides with ports 11a which connect each of the cylinders directly with the reservoir. These ports consist preferably of triangular openings of greater altitude than base and with the apexes of the ports toward the outer ends of the cylinders, for the purposes to be hereinafter described.

In these cylinders are reciprocally mounted pistons 12 which consist of piston heads 12a, pump leathers 12b at the outer sides of the piston heads, and cups 12c placed with their heads against the leathers and with the cylindrical portions or aprons against the walls of the cylinders and adapted partly or wholly to cover the ports.

The inner sides or ends of the pistons are pivotally connected, one by a main connecting rod 21 and the others by connecting rods 22, to an eccentric band 23. The main connecting rod 21 is rigidly secured to the eccentric band, and is adapted to oscillate the latter with the reciprocation of the connecting rod 21, while the connecting rods 22 are pivotally connected to the band. This band is rotatably mounted, by a roller bearing, on an eccentric 24. This eccentric is mounted on the spindle 1, but shiftable transversely with respect thereto, so that the axis of the eccentric and of the spindle may be shifted coincident with each other when not desiring to reciprocate the pistons; or the eccentric may be shifted various distances with respect to the axis of the spindle for varying the stroke of the pistons.

The eccentric 24 is provided with a transverse slot 24a, through which extends a rectangular portion 1a of the spindle for non-rotatably mounting the eccentric on the spindle, but the slot 24a is of sufficient length to permit transverse shifting or adjustment of the eccentric for adjusting the axis of the eccentric coincident with the axis of the spindle or eccentric with respect thereto.

The lateral or transverse shifting of the eccentric is effected by a cam 31, in the form of an eccentric. This cam is mounted on the inner end of a spindle 32 which extends through a flange portion 1b of the spindle 1, on which flange portion the roller bearing 3 is mounted. This eccentric 31 is located in a transversely recessed portion 34 at the back or inner side of the eccentric 24. At the outer end of the spindle 32 is an arm 33 for rotating the cam or eccentric 31 and thereby raising the eccentric 24, that is, shifting it eccentrically with respect to the axis of the wheel.

The arm 33 is shifted by any suitable brake applying means (not shown).

The radially inner ends of the cylinders 11 and the skirts of the pistons 12ª are connected by flexible liners or casings 41 which are intended to prevent needless dripping or escape of oil or other fluid from the cylinders and reservoir.

The operation of my brake is briefly as follows:

During ordinary operation, the eccentric is coaxial with axis of revolution of the revoluble member, permitting the latter to revolve freely. If it is desired to apply the brakes, the lever 33 is drawn backwardly, as the structure is shown in Fig. 2, or shifted clockwise, as shown in Fig. 1, forcing the eccentric 24 to an off-center or eccentric position. Rotation of the member 2 causes reciprocation of the pistons in the cylinders and thereby creates resistance to the rotation. As the eccentric is shifted toward its extreme position, so that one piston, at the outer end of its stroke, covers increasingly more of the outwardly converging port 11ª, resistance to the rotation of the member 2 is constantly increased until a maximum position is reached. In this maximum or extreme position, the port is completely covered, causing positive compression of the liquid and thereby providing extreme or positive resistance to further rotation of the revoluble member 2.

Though I have shown and described a particular construction, combination and arrangement of parts and portions of my new hydraulic brake, I do not wish to be limited to the same, but desire to include in the scope of my invention the construction, combination and arrangement substantially as set forth in the appended claims.

I claim:

1. In a fluid brake, a supporting member, a revoluble member mounted thereon, one of said members having a plurality of radiating cylinders, each cylinder having in its side wall an opening connected with a corresponding opening in another cylinder, a piston reciprocally mounted in each cylinder, an eccentric on the other of said members and shiftable eccentric with the axis of rotation of the revoluble member, and means operatively connecting the eccentric with the pistons, each piston closing the opening of the respective cylinder when the eccentric is shifted to its extreme eccentric position and when the respective piston is at the end of one stroke during its extreme reciprocation.

2. In a fluid brake, a supporting member, a revoluble member mounted thereon, a reservoir in association with one of said members, a compression chamber in one of said members having an opening in its wall connecting the chamber to the reservoir, a piston reciprocally mounted in the chamber, an eccentric on the other of said members and shiftable eccentric with the axis of rotation of the revoluble member, and means operatively connecting the eccentric with the piston, said piston closing said opening when the eccentric is shifted to its extreme eccentric position and when the piston is at the end of one stroke during extreme reciprocation.

3. In a fluid brake, a supporting member, a revoluble member mounted thereon, a reservoir in association with one of said members, a compression chamber in the revoluble member having an opening in its wall connecting the chamber to the reservoir, a piston reciprocally mounted in the chamber, an eccentric on the supporting member and shiftable eccentric with the axis of rotation of the revoluble member, and means operatively connecting the eccentric with the piston, said piston closing said opening when the eccentric is shifted to its extreme eccentric position and when the piston is at the outer end of its stroke during extreme reciprocation.

4. In a fluid brake, a supporting member, a revoluble member mounted thereon, one of said members having a plurality of radiating cylinders, each cylinder having in its side wall an opening connected with a corresponding opening in another cylinder, a piston reciprocally mounted in each cylinder, an eccentric on the other of said members and shiftable eccentric with the axis of rotation of the revoluble member, and means operatively connecting the eccentric with the pistons, each piston gradually closing the opening of the respective cylinder near the end of one stroke of the piston when the eccentric is shifted to its extreme eccentric position, and fully closing said opening when the respective piston is at the end of said stroke during its extreme reciprocation.

5. In a fluid brake, a supporting member, a revoluble member mounted thereon, a reservoir in association with one of said members, a compression chamber in one of said members having an opening in its wall connecting the chamber to the reservoir, a piston reciprocally mounted in the chamber, an eccentric on the other of said members and shiftable eccentric with the axis of rotation of the revoluble member, and means operatively connecting the eccentric with the piston, said piston gradually closing said opening near the end of one stroke of the piston when the eccentric is shifted to its extreme eccentric position, and fully closing said opening when the piston is at the end of said stroke during extreme reciprocation.

6. In a fluid brake, an axle, a wheel revolubly mounted thereon, an annular reservoir in the wheel, cylinders radially arranged in the wheel intercepting the reservoir and having openings in their side walls communicating freely with the reservoir, a piston reciprocally mounted in each cylinder, an eccentric mounted on the axle and shiftable eccentric with the axis of rotation of the wheel, an eccentric band on the eccentric and pivotally connected directly to one of the pistons, and rods each pivotally connected at its opposite ends to one of the other pistons and to the band, each piston closing the opening of the respective cylinder when the eccentric is shifted to its extreme eccentric position and when the respective piston is at the outer end of its stroke during its extreme reciprocation.

7. In a fluid brake, an axle, a wheel revolubly mounted thereon, an annular reservoir in the wheel, cylinders radially arranged in the wheel intercepting the reservoir and having openings in their side walls communicating freely with the reservoir, a piston reciprocally mounted in each cylinder, an eccentric mounted on the axle and shiftable eccentric with the axis of rotation of the wheel, an eccentric band on the eccentric and pivotally connected directly to one of the pistons, and rods each pivotally connected at its opposite ends to one of the other pistons and to the band, each piston gradually closing the opening of the respective cylinder during the outward stroke of the piston when the eccentric is shifted to its extreme eccentric position, and fully closing said opening when the respective piston is at the outer end of its stroke during its extreme reciprocation.

8. In a fluid brake, a supporting member, a revoluble member mounted thereon, a reservoir in association with one of said members, a compression chamber in one of said members having an opening in its wall connecting the chamber to the reservoir, a compression member reciprocally mounted in the chamber, an eccentric on the other of said members and shiftable eccentric with the axis of rotation of the revoluble member, and means operatively connecting the eccentric with the compression member, the width of said opening decreasing toward one end of the chamber, said compression member gradually closing said opening when the eccentric is shifted to its extreme eccentric position and when the compression member is at the end of said stroke during extreme reciprocation.

HOWARD E. MARSH.